US011151376B2

(12) United States Patent
Rogan

(10) Patent No.: US 11,151,376 B2
(45) Date of Patent: Oct. 19, 2021

(54) RIDER-DRIVER LOCALIZATION FOR DETERMINING PLACEMENT OF AR CONTENT FOR PASSENGER

(71) Applicant: Uber Technologies, Inc., San Francisco, CA (US)

(72) Inventor: Aaron Matthew Rogan, Westminster, CO (US)

(73) Assignee: Uber Technologies, Inc., San Francisco, CA (US)

( * ) Notice: Subject to any disclaimer, the term of this patent is extended or adjusted under 35 U.S.C. 154(b) by 20 days.

(21) Appl. No.: 16/712,902

(22) Filed: Dec. 12, 2019

(65) Prior Publication Data

US 2020/0234048 A1 Jul. 23, 2020

Related U.S. Application Data

(60) Provisional application No. 62/812,101, filed on Feb. 28, 2019, provisional application No. 62/812,098, (Continued)

(51) Int. Cl.
*G06K 9/00* (2006.01)
*G06F 3/01* (2006.01)
(Continued)

(52) U.S. Cl.
CPC ....... *G06K 9/00624* (2013.01); *G01C 21/343* (2013.01); *G01C 21/3438* (2013.01); *G01C 21/3644* (2013.01); *G01S 19/48* (2013.01); *G06F 3/016* (2013.01); *G06F 16/587* (2019.01); *G06F 16/5866* (2019.01); *G06F 16/7837* (2019.01); *G06K 9/00671* (2013.01); *G06K 9/00791* (2013.01); *G06K 9/6201* (2013.01); *G06K 9/6215* (2013.01); *G06Q 10/02* (2013.01); *G06Q 10/047* (2013.01); *G06Q 50/30* (2013.01); *G06T 19/006* (2013.01); *G06T 19/20* (2013.01); *H04B 1/3827* (2013.01); *H04L 67/18* (2013.01); *H04N 5/23222* (2013.01);
(Continued)

(58) Field of Classification Search
None
See application file for complete search history.

(56) References Cited

U.S. PATENT DOCUMENTS 8,483,715 B2 7/2013 Chen
10,573,020 B1 * 2/2020 Sokolov ............. G06K 9/00906
(Continued)

*Primary Examiner* — Patrick F Valdez
(74) *Attorney, Agent, or Firm* — Fenwick & West LLP

(57) ABSTRACT

Systems and methods are disclosed herein for determining placement of Augmented Reality (AR) content. In some embodiments, a processor detects input at a first client device of a first user that a transportation session between the first user and a second user has begun. In response to detecting the input, the processor determines a first location of the first client device based on an image captured by the first client device, and determines a geospatial offset of a second client device of the second user from the first client device. The processor determines a second location of the second client device based on the first location of the first client device and the geospatial offset, and generates for display by the second client device AR content, the AR content being selected based on an orientation of the second client device and the second location.

17 Claims, 6 Drawing Sheets

Related U.S. Application Data filed on Feb. 28, 2019, provisional application No. 62/812,107, filed on Feb. 28, 2019, provisional application No. 62/802,145, filed on Feb. 6, 2019, provisional application No. 62/801,012, filed on Feb. 4, 2019, provisional application No. 62/801,010, filed on Feb. 4, 2019, provisional application No. 62/795,988, filed on Jan. 23, 2019.

(51) Int. Cl.

| | |
|---|---|
| *G06K 9/62* | (2006.01) |
| *H04B 1/3827* | (2015.01) |
| *H04W 4/029* | (2018.01) |
| *G06F 16/587* | (2019.01) |
| *G01C 21/34* | (2006.01) |
| *G06Q 10/02* | (2012.01) |
| *G06Q 10/04* | (2012.01) |
| *G06Q 50/30* | (2012.01) |
| *H04W 4/021* | (2018.01) |
| *G01S 19/48* | (2010.01) |
| *G06F 16/783* | (2019.01) |
| *G01C 21/36* | (2006.01) |
| *G06F 16/58* | (2019.01) |
| *H04W 4/18* | (2009.01) |
| *G06T 19/00* | (2011.01) |
| *G06T 19/20* | (2011.01) |
| *H04L 29/08* | (2006.01) |
| *H04N 5/232* | (2006.01) |

(52) U.S. Cl.
CPC .......... *H04W 4/021* (2013.01); *H04W 4/029* (2018.02); *H04W 4/185* (2013.01); *G06T 2200/24* (2013.01); *G06T 2219/024* (2013.01)

(56) References Cited

U.S. PATENT DOCUMENTS

| | | | |
|---|---|---|---|
| 10,834,523 B1* | 11/2020 | Rao | H04W 4/021 |
| 2014/0100995 A1 | 4/2014 | Koshy et al. | |
| 2014/0172640 A1 | 6/2014 | Argue et al. | |
| 2017/0103571 A1 | 4/2017 | Beaurepaire | |
| 2017/0243403 A1 | 8/2017 | Daniels et al. | |
| 2017/0292313 A1* | 10/2017 | Herman | G08G 1/202 |
| 2017/0343375 A1 | 11/2017 | Kamhi et al. | |
| 2017/0358147 A1* | 12/2017 | Brinig | H04W 4/42 |
| 2020/0068345 A1* | 2/2020 | Ondruska | G01S 5/0054 |
| 2020/0124427 A1* | 4/2020 | Kline | G01C 21/32 |

* cited by examiner

RIDER-DRIVER LOCALIZATION FOR DETERMINING PLACEMENT OF AR CONTENT FOR PASSENGER

CROSS-REFERENCE TO RELATED APPLICATION

This application claims the benefit of U.S. Provisional Application No. 62/812,107, filed Feb. 28, 2019, U.S. Provisional Application No. 62/795,988, filed Jan. 23, 2019, U.S. Provisional Application No. 62/812,101, filed Feb. 28, 2019, U.S. Provisional Application No. 62/812,098, filed Feb. 28, 2019, U.S. Provisional Application No. 62/801,010, filed Feb. 4, 2019, U.S. Provisional Application No. 62/801,012, filed Feb. 4, 2019, U.S. Provisional Application No. 62/802,145 filed Feb. 6, 2019, which are incorporated by reference in their entirety.

TECHNICAL FIELD

The present disclosure relates to location determination with limited or no reliance on global positioning system (GPS) signals, and in particular to using the location determination of one device to localize another device for the purpose of optimally placing augmented reality (AR) content.

BACKGROUND

Many systems use augmented reality (AR) to enhance user experience (e.g., by using haptics or visual enhancements). Oftentimes, implementing AR content requires knowledge of a user's location, to ensure that the AR content is relevant. For example, overlaying on top of an image captured by a user's mobile phone information about what the image includes often requires knowledge of where the image is taken to determine appropriate contents for the overlay. However, there are times that systems are unable to accurately determine a user's location. A user's location is often able to be determined using a global positioning system (GPS) sensor of the user's mobile device as a proxy. This solution is not perfect. For example, in an urban canyon, where buildings obscure satellite signals, GPS traces of a user's mobile device are likely inaccurate. Furthermore, where extreme precision is required (e.g., where properly placing AR content requires precision to a unit smaller than available by way of a GPS reading), even outside of an urban canyon, GPS traces are an inadequate proxy for user location. Thus, implementing AR overlays on images of, e.g., a user's mobile device that are location-sensitive will likely amount to presenting irrelevant information that may annoy or frustrate the user using existing systems.

SUMMARY

Systems and methods are disclosed herein for determining placement of AR content (e.g., where GPS is ineffective to aid in determining placement of location-sensitive AR content). For example, if a user is in an urban canyon, or if the user requires precision in location determination that GPS services are inadequate to provide, the systems and methods disclosed herein nonetheless enable accurate placement of AR content. To this end and others, a service (e.g., that provides an application for coordinating a transportation service) detects input at a client device of, e.g., a driver, that a transportation session between the driver and a rider has begun.

In response to detecting the input, the service may seek to determine a location of the rider's device for the purpose of displaying AR content. The service may determine a need to obtain a highly accurate determination of the location of the rider's device in connection with offering location-sensitive AR content. The service may additionally determine that the rider's device's GPS capabilities are insufficient for obtaining the highly accurate determination of the rider's location (e.g., because the rider's device is in an urban canyon, or because the level of precision required is beyond that the GPS sensor of the rider's device is equipped to provide). The service may further determine that it is capable of obtaining a highly accurate determination of the driver's device, and thus may use the driver's device determination to form a determination of the rider's device's location.

Accordingly, in order to determine the rider's location with the requisite precision, the service may determine a location of the driver's device using an image captured by the first client device (e.g., by comparing the image to entries of known databases and determining, based on a match to an entry, a location indicated by the entry that is a precise location at which the driver was when the image was captured). The service may then determine a geospatial offset of the rider's device with respect to the driver's device (e.g., based on short range communication signals, physical sensors within the driver's vehicle, etc.), and may determine the location of the rider's device using location of the driver's device and the geospatial offset. The service may then generate display by the rider's device AR content, the AR content being selected based on an orientation of the rider's device and the rider's location.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
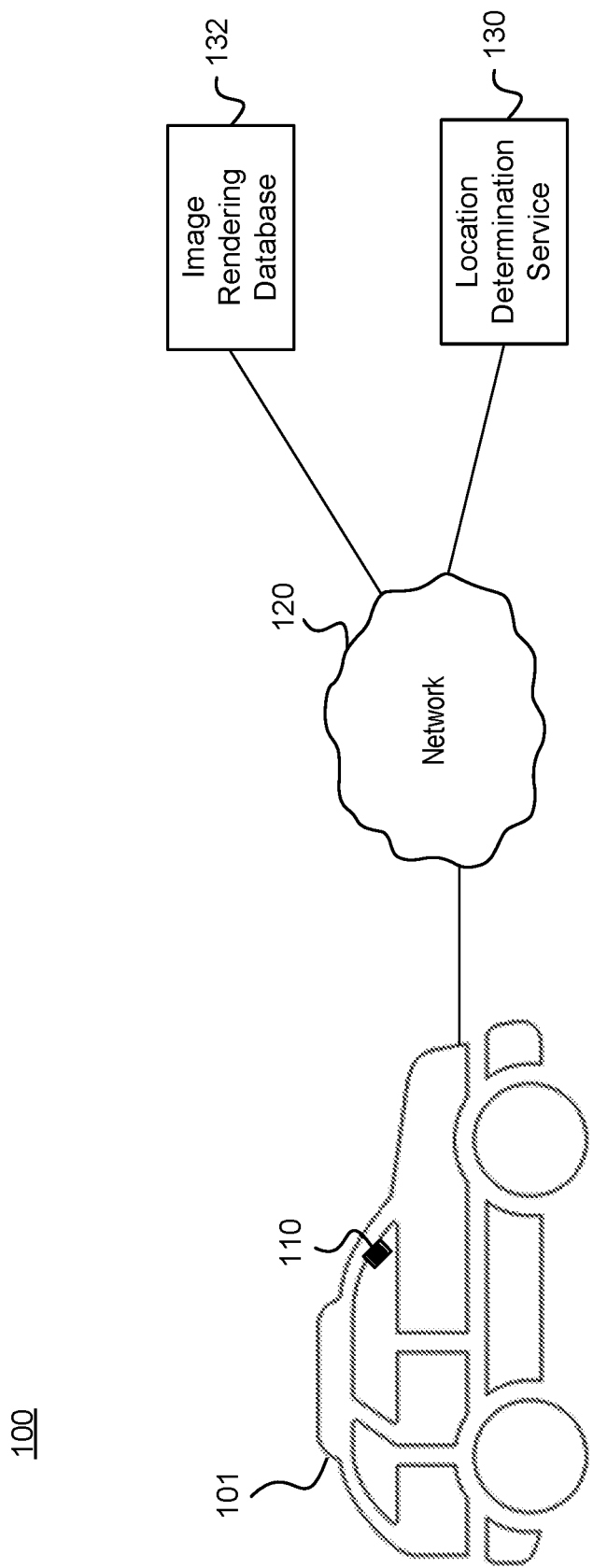
FIG. 1 is a block diagram illustrating a location estimation system according to one embodiment.

FIG. 1 is a block diagram illustrating a location estimation system according to one embodiment. System 100 includes vehicle 101, which includes or is carrying client device 110. The functionality of client device 110 is described in further detail with respect to FIG. 6 below. In some embodiments, client device 110 is integrated into vehicle 100 as a component of vehicle 100. Client device 110 executes an application, such as a transportation service and/or ridesharing application where a rider may request transportation from the rider's current location to a desired destination, and where the rider may be connected to a driver who also uses the transportation service application, where the driver will provide the transportation. While the driver travels toward a rider, and while the driver is transporting a rider to a destination, a map may be viewed by the driver or the rider via the transportation service application where the driver's position is displayed. In an exemplary embodiment, client device 110 is mounted on a dashboard of vehicle 101 and has a forward-facing camera that faces the road. While this exemplary embodiment is referred to throughout, in some embodiments, the application instead commands images to be captured from a stand-alone camera or a camera embedded in other hardware (e.g., embedded in a device that is affixed to a dashboard of vehicle 101, as part of a dash cam, etc.). As a primary example as used herein, client device 110 is a client device (e.g., mobile device or smartphone) of a driver of vehicle 101

In an embodiment, client device 110 automatically captures one or more images based on commands received from the application. For example, client device 110 captures an image upon a driver of vehicle 101 accepting a transportation request from a rider, or upon a certain condition being satisfied (e.g., a certain distance has been traveled, or a certain amount of time has passed, from a reference point). Automatic capturing of one or more images may be an opt-in feature, where the application by default does not automatically capture images using a camera of client device 110, and where the application has a setting that, if selected by a user of client device 110 (e.g., a driver of vehicle 101), enables the application to automatically capture the images. While accurate pinpointing of a driver's location using the systems and methods described herein may rely on opting in, the location of the driver may be determined based on GPS traces of client device 110 (even if inaccurate) should a driver of vehicle 101 not opt in.

In some embodiments, client device 110 transmits the image(s) to location determination service 130 over network 120, where location determination service 130 receives the image(s) and compares them to known images, stored at image rendering database 132, to determine the location of client device 110. In some embodiments, the functionality of location determination service 130 and/or image rendering database 132 is located within client device 110, and thus need not be accessed by network 120, as depicted. Functionality of location determination service 130 may be integrated as a module of the application (e.g., the transportation service application). Image rendering database 132 may be accessed by location determination service 130 directly, or over network 120. Location determination service 130 may be a module of an application, such as a transportation service application, or may be a component of a transportation service generally, such as a ridesharing service. In some embodiments where location determination service 130 is a module of the application, some or all of the contents of image rendering database 132 are transmitted to the client device for performing localization at the client device. The functionality of location determination service 130 will be described in further detail below with respect to FIGS. 2-5.

Identifying Regions Prone to Erroneous GPS Readings

Figure 2:
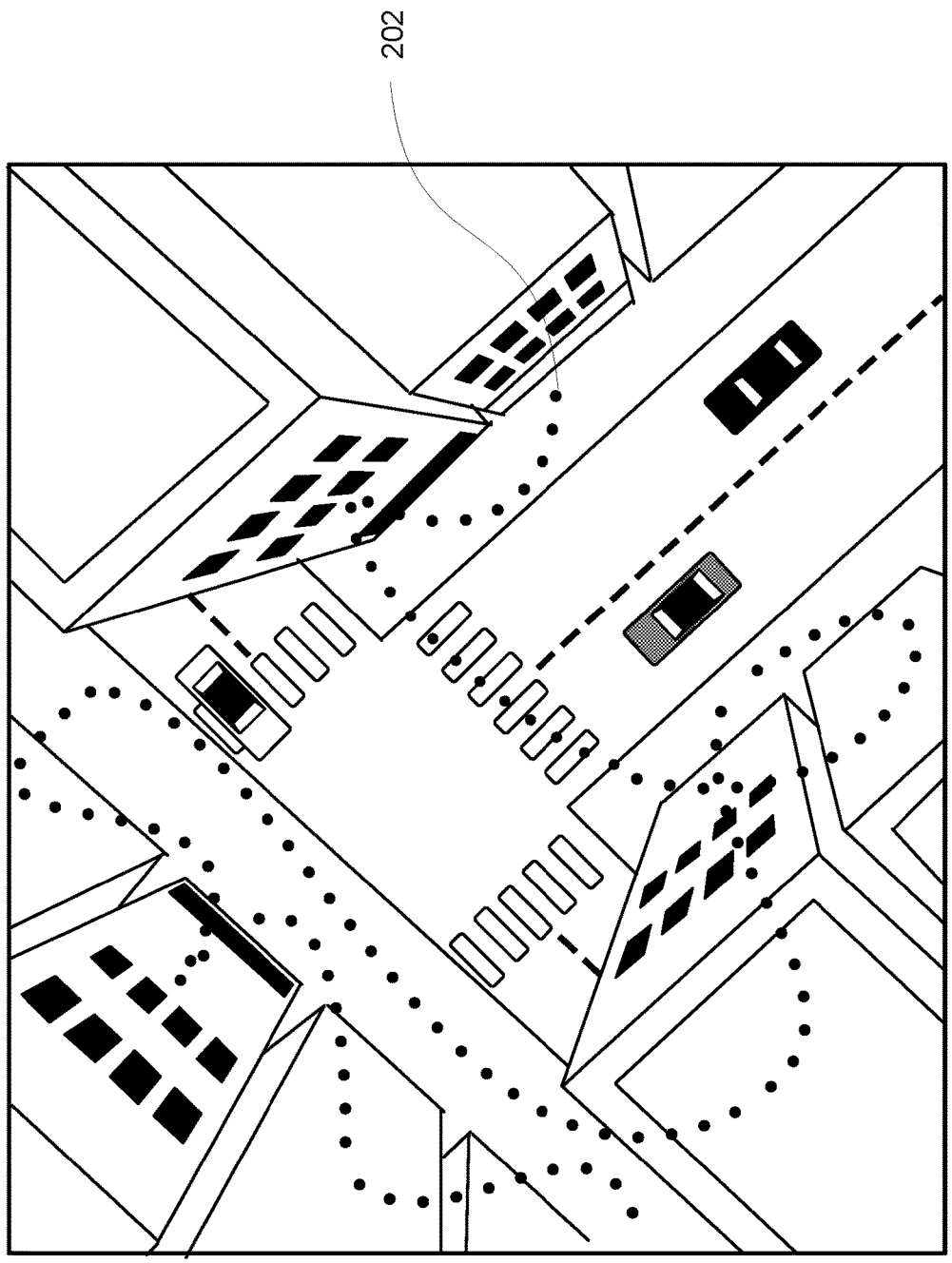
FIG. 2 is an illustration of GPS traces in a region where GPS signals are inaccurate according to one embodiment.

FIG. 2 is an illustration of GPS traces in a region where GPS signals are inaccurate according to one embodiment. Region 200 includes GPS traces 202 of a client device (e.g., client device 110) as derived from a GPS sensor of client device 110. As an illustrative example, the GPS traces 202 were derived from client device 110 while vehicle 101 was on a road. Because of the existence of tall buildings within region 200, the GPS signals used to derive the GPS traces are distorted and provide inaccurate GPS traces. This is evidenced by the GPS traces being at locations that are not on a road.

Region 200 is exemplary of a location known to location determination service 130 to have or cause erroneous GPS data. The identification of various regions, like region 200, which are associated with erroneous GPS data may be performed automatically by location determination server 130, or may be made based on manual feedback (e.g., performed in advance of executing process 500). For example, location determination service 130 may detect that users of a transportation service application in a given location set a pickup pin at a location different from their GPS traces at a frequency that exceeds an implementer-defined threshold, and may determine therefrom that GPS data derived from client devices within that region are likely erroneous. As another example, location determination service 130 may detect that GPS traces of users (e.g., drivers) of a transportation service application are, at a frequency above a threshold, in areas inaccessible to drivers, such as within buildings or parks that do not have road access, and may determine therefrom that GPS data derived from client devices within that region are likely erroneous. As yet another example, location determination service 130 may receive feedback from users that their client devices are determining erroneous locations based on GPS sensors of those client devices, and may determine therefrom that GPS data derived from client devices within that region are likely erroneous.

While being in a region such as region 200 may cause the application to determine that GPS data of a client device is insufficient for use in selecting geographically-sensitive AR content, there are additional reasons why the application may come to the same determination (e.g., where the application determines that the AR content requires a location to be precise beyond the capabilities of GPS).

Exemplary Geospatial Offset Determination Between Rider and Driver

Figure 3:
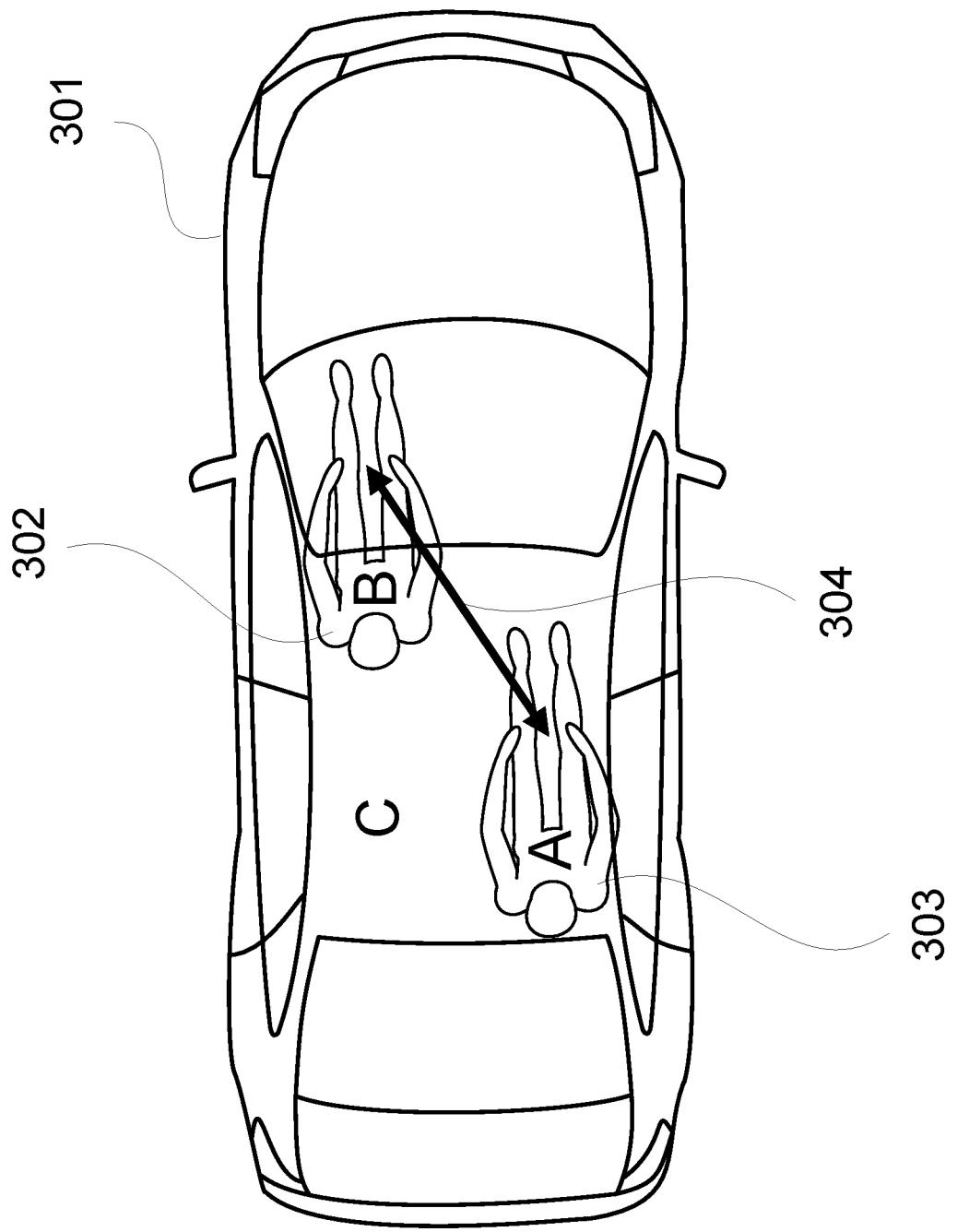
FIG. 3 is an illustration of a manner in which a geospatial offset between a rider and a driver may be determined, according to one embodiment.

FIG. 3 is an illustration of a manner in which a geospatial offset between a rider and a driver may be determined, according to one embodiment. Vehicle 301 includes the same functionality as described with respect to vehicle 101 of FIG. 1. Vehicle 301 is designed for humans to be seated at various positions. For example, vehicle 301 is designed for a driver 302 to sit at position B. Vehicle 301 is designed for a rider 303 to sit at positions A or C. Positions A, B, and C are exemplary in nature; vehicle 301 may be designed for driver 302, or rider 303, to sit at any number of positions. While only one driver and one rider is depicted in Vehicle 301, this is merely for convenience; multiple drivers and/or multiple riders may be seated at any position of vehicle 301. Moreover, while the geospatial offset is described between rider 303 and driver 302 (or the client devices corresponding to each of rider 303 and driver 302), the same disclosure applies to a scenario where the geospatial offset is described between rider 303 and another camera or camera-enabled device within vehicle 301 (e.g., a device with a camera that is attached to the windshield or dashboard of the vehicle 301, a standalone camera, a camera embedded in other hardware, and the like). Localization techniques described based on the geospatial offset calculation equally apply to such scenarios. Furthermore, rider 303 may localize using reference points unrelated to driver 302; for example, rider 303 may localize relative to any other camera-enabled equipment in vehicle 301, such as a client device of another rider, a rear-view camera of vehicle 301, and the like. Wherever localization is described with respect to driver 303, localization is equally applicable to the non-driver embodiments mentioned here.

Also depicted in FIG. 3 is geospatial offset 304. Either the application, or location determination service 130, may determine geospatial offset 304, though for exemplary purposes, the calculation will be described here from the perspective of location determination service 130 (which, as described above, could be a module of the application and fully or partially housed within a client device of driver 302 or rider 303). While geographical offset 304 is depicted as an offset between rider 303 and driver 302, geographical offset 304 may be an offset between a client device of driver 302 (e.g., client device 110), and a client device carried by rider 303. In some embodiments, location determination service 130 receives feedback from a pressure sensor of vehicle 301 at a position (e.g., position A), and determines based on the feedback that rider 303 is seated at position A. Location determination service 130 may have knowledge of a distance and direction that forms geospatial offset 304 between positions A and B (e.g., by referencing a database storing positions in vehicle 301 and storing geospatial offsets from each known position to the position of driver 302 (i.e., position B)). For example, the referenced database may be a database that stores known positions for known makes and models of potential vehicles 301.

In some embodiments, location determination service 130 determines the distance and direction of geospatial offset 304 based on a visual sensor, such as a camera of a client device of rider 303 or driver 302, by ingesting an image. For example, rider 303 may use a client device to take a picture of driver 302, or driver 302 may use a client device to take a picture of rider 303. Location determination service 130 may determine, based on the picture, the distance and direction of geospatial offset 304. For example, if taken by the rider, the picture may include the driver, as well as features of the car (e.g., a driver-side window or mirror, passenger seats, etc.) that enable location determination service 130 to determine an angle from which the picture was taken, which enables location determination service 130 to determine both the direction and distance of geospatial offset 304.

In some embodiments, location determination service 130 may determine a distance component of geospatial offset 304 separately from determining a directional component of geospatial offset 304. Location determination service 130 may determine the distance component based on, e.g., a signal strength of a signal connecting client devices of driver 302 and rider 303 (e.g., a short-range signal such as a Bluetooth signal). Location determination service 130 may determine the direction based on, e.g., feedback from a compass sensor of the client device, an orientation of the client device as determined from an image captured by the client device, etc. Any other method for determining a direction and distance of geospatial offset 304 is within the scope of this disclosure.

As will be discussed below with respect to FIG. 5, location determination service 130 uses geospatial offset 304 to determine where to place AR content for rider 303. If rider 303 moves from position A to position C, geospatial offset 304 will change. Thus, when location determination service 130 detects movement of the rider from position A to position C, location determination service 130 will recalculate geospatial offset 304. Location determination service 130 may determine that the rider has moved from position A to position C based on, e.g., feedback from an accelerometer of the client device of rider 303, feedback from an image sensor, and the like. In response to determining that rider 303 has moved from one position to another of vehicle 301, location determination service 130 recalculates an updated geospatial distance 304 using the techniques described in the foregoing.

AR Content Placement Determination

Figure 4:
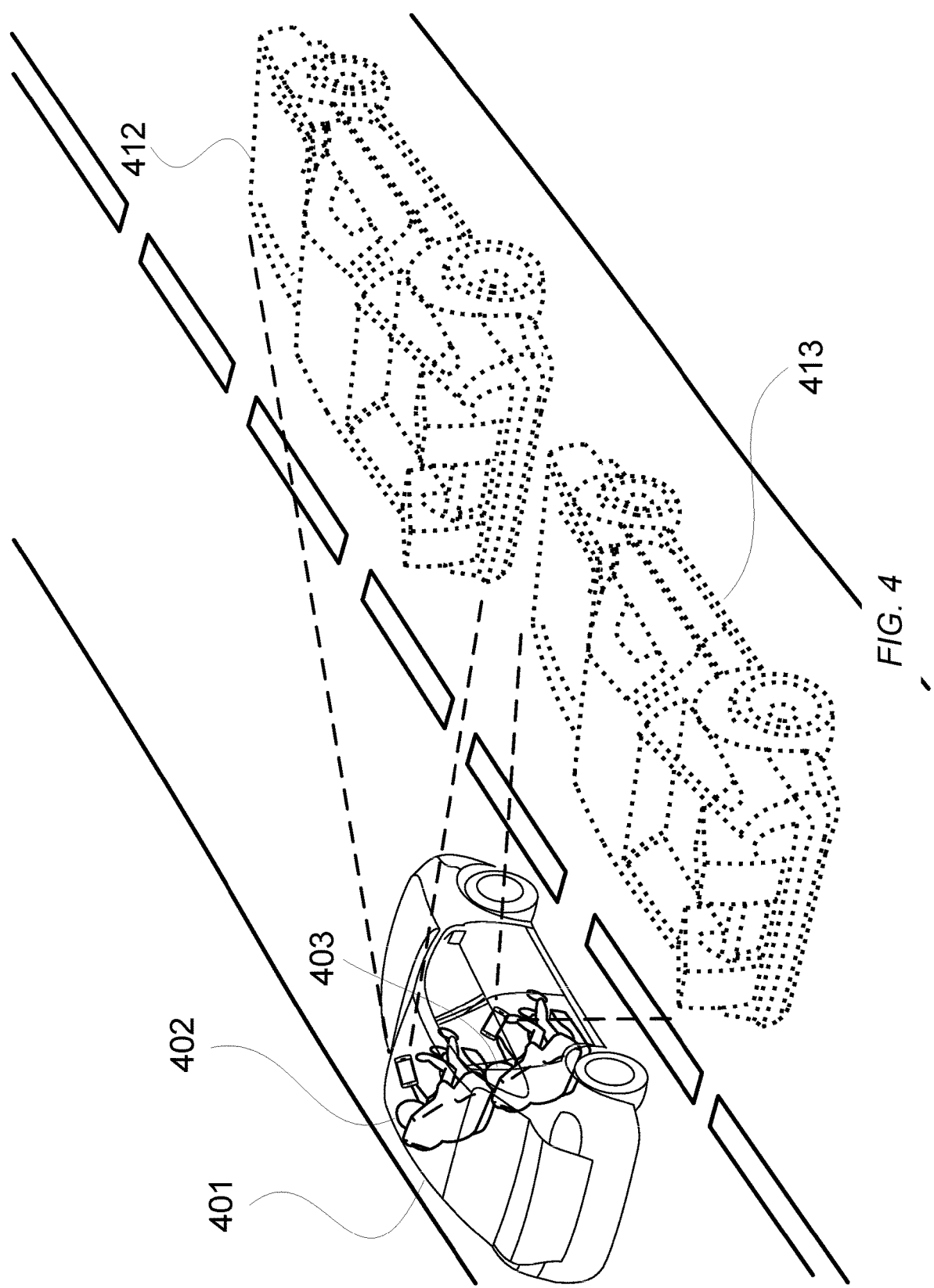
FIG. 4 is an illustration of how AR content may be generated for display using a rider's determined location in connection with the geospatial offset, according to one embodiment.

FIG. 4 is an illustration of how AR content may be generated for display using a rider's determined location in connection with the geospatial offset, according to one embodiment. FIG. 4 depicts driver 402 and rider 403 in vehicle 401, in a similar configuration to that described with respect to FIG. 3. As will be described below with respect to FIG. 5, it may be impractical or impossible to use sensors of a client device of rider 403 to determine, with sufficient precision, the location of rider 403; however, it may be possible to determine, with sufficient precision, the location of driver 402. By determining the position of driver 402, and determining the geospatial offset between driver 402 and rider 403 (e.g., geospatial offset 304), the application is able to determine with precision the location of rider 403, and is thus able to determine where to place AR content for rider 403.

As depicted in FIG. 4, AR content is available at position 412 and at position 413. In this example, position 412 is a relative position to the location of driver 402, and similarly, position 413 is a relative position to the location of rider 403. When rider 403 executes the application and orients his or her mobile device to position 412, rider 403 would not see any AR content; however, when rider 403 orients his or her mobile device toward position 413, rider 403 would see, in this example, a DeLorean car that is driving alongside vehicle 401 when using the application. The reason why AR content is rendered at a location relative to each individual is because the AR content is highly sensitive to where each person is. For example, rider 403 would have a harder time seeing and appreciating the DeLorean car at position 412 than position 413. In some embodiments, different riders in vehicle 401 may wish to view the AR content from the perspective of another rider. The application may generate for display a selectable option corresponding to one or more other riders in the car. In response to detecting the selection of a selectable option, the application may render AR content relative to the selected user, rather than relative to the user who made the selection.

The depiction in FIG. 4 is merely illustrative; in some embodiments, AR content may be visible at the same position to both driver 402 and rider 403. For example, while FIG. 4 depicts that AR content is rendered at locations relative to each individual, AR content may alternatively be rendered relative to one individual (e.g., rider 403), such that the DeLorean car would be visible to both rider 403 and driver 402 when their respective mobile devices are oriented toward position 413. As another example, AR content may be rendered relative to vehicle 401, rather than relative to any particular rider or driver in vehicle 401, in order to optimize the locations of where AR content is placed for all passengers of vehicle 401.

In some embodiments, the application may determine the AR content based on a destination input by the rider for the transportation session. For example, the application may detect that rider 403 requested vehicle 401 take the rider to a movie theater at midnight. The application may determine that the movie theater is hosting a midnight showing of Back to the Future, a movie where a DeLorean is heavily featured. The application may thus determine to, among candidate AR content, select the DeLorean as the AR content to be displayed to the rider. A database of AR content may be referenced to determine a relative location to the user to which the AR content is to be displayed. The application may thereby determine that the DeLorean is to be located at position 413 relative to rider 403, and require the rider orient his or her mobile device to that position.

In some embodiments, the application may determine, in addition to the destination of rider 403, or instead of the destination of rider 403, the AR content based on profile information of rider 403. For example, the application may determine preferences of the user, biographical information of the user, demographic information of the user, and the like, e.g., based on the user's past activities within the context of the application, or by obtaining data from a third party provider of such information. The application may distill the information using known techniques to target a particular piece of content (e.g., AR content that is an advertisement) to the user.

Accurately Displaying AR Content Based on Rider Location

Figure 5:
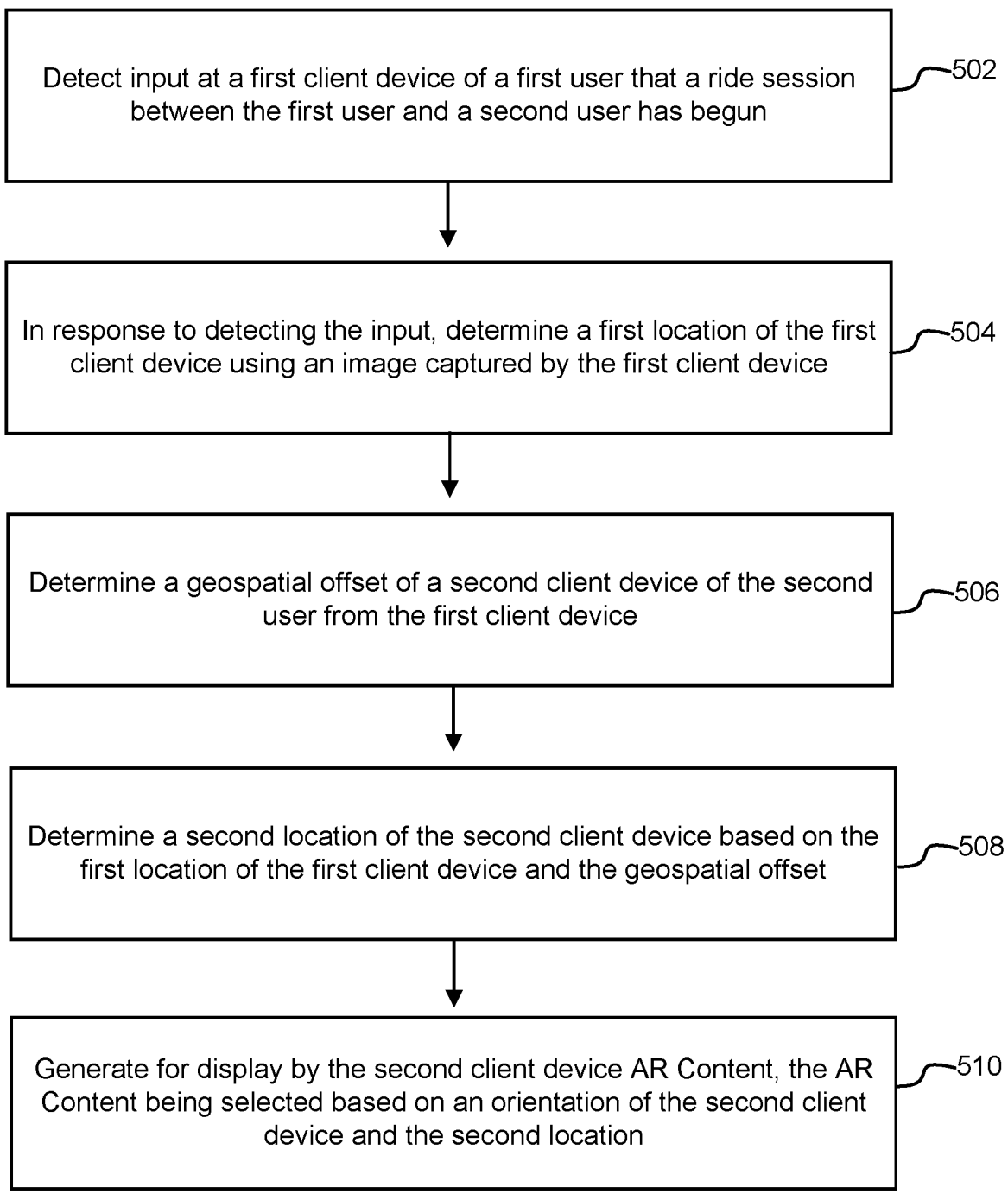
FIG. 5 is an illustrative flowchart of a process for accurately displaying AR content based on a rider's location, according to one embodiment.

FIG. 5 is an illustrative flowchart of a process for accurately displaying AR content based on a rider's location, according to one embodiment. Process 500 begins by the application detecting 502 input at a first client device of a first user that a transportation session between the first user and a second user has begun. For example, the first user may be a driver (e.g., driver 302), and the second user may be a rider (e.g., rider 303). The input may be a detection that driver 302 has selected a "begin ride" option that the application generated for display on client device 110, which may indicate that driver 302 has successfully picked up rider 303. The input may alternatively be an electronic handshaking that does not require manual input from driver 302 (e.g., client device 110 receiving a signal (e.g., a short range signal) from a client device of rider 303 that certifies that rider 303 is within vehicle 301). The term "transportation session," or "ride session," as used herein, may refer to a time between when the input is detected and a time when the application detects/determines that rider 303 has exited vehicle 301 (e.g., when the application detects that driver 302 has selected a "ride complete" option that the application generated for display on client device 110, which may indicate that driver 302 has successfully dropped off rider 303).

In response to detecting 502 the input, the application determines 504 a first location of the first client device using an image captured by the first client device. For example, the application may call to location determination service 130, or execute a module for location determination service 130 to run, to determine the location of driver 302's client device 110. The location determination service may receive from client device 110, a rendering of an image that was captured by client device 110 (e.g., at a time on or around the start of the transportation session). The rendering may be an image itself, or a transformation of the image. In the case where the rendering is a transformation of the image, the client device may generate the rendering, or a module of location determination service 130 may generate the rendering upon receiving the image. To generate the rendering in the case where the rendering is a transformation of the image, client device 110 or location determination service 130 may generate a three-dimensional model of the captured image, and may register the three-dimensional model to three-dimensional content stored at image rendering database 132.

In some embodiments, the rendering is generated as part of a localization process (e.g., 2D-3D or 3D-3D localization). For example, client device 110 or location determination service 130 extracts 2D image features, e.g., using scale invariant feature transform ("SIFT"), object request broker ("ORB"), speed up robust features ("SURF"), or the like. In some embodiments, location determination service 130 or client device 110 builds a three-dimensional model from the captured image using a machine learned model.

In some embodiments, location determination service 130 goes on to compare the received rendering to entries in a database (e.g., image rendering database 132), each respective entry including a rendering and a respective associated location that is within the geographical area. For example, keypoints of the received rendering may be extracted and compared to keypoints of candidate renderings to determine whether a threshold amount of keypoints match. In some embodiments, to improve efficiency of this operation, location determination service 130 compares the received rendering to the entries by extracting geolocation data from the captured rendering. For example, even if GPS data obtained by client device 110 is erroneous, it is likely to be within a threshold distance from the actual location of client device 110. Location determination service 130 then determines a subset of the entries having geolocation data corresponding to the GPS data obtained by client device 110. For example, location determination service 130 determines a radius of actual GPS coordinates that are within a threshold distance of a location indicated by the geolocation data. Location determination service 130 limits the comparing of the received rendering to the subset of the entries, thus ensuring a savings of processing time and power, as only entries that are within a threshold radius of client device 110 will be searched, as opposed to all entries of image rendering database 132.

Location determination service 130 may determine whether the received rendering matches a respective rendering included in a respective entry of the database of renderings. In some embodiments, in order to perform this determination, location determination service 130 determines that the received rendering does not completely match any entry of the entries. For example, when comparing two-dimensional renderings, location determination service 130 may determine that not all keypoints of the received rendering match any candidate rendering. When comparing three-dimensional renderings, location determination service 130 may determine that the keypoints of the image do not match all keypoints of any perspective of any candidate rendering.

In response to determining that the received rendering does not completely match any entry of the entries, location determination service 130 determines that a percentage of characteristics of the received rendering match characteristics of the given entry, and determines whether the percentage exceeds a threshold. In response to determining that the percentage exceeds the threshold, location determination service 130 determines that the received rendering matches the given entry based on the partial match. Likewise, in response to determining that the percentage does not exceed the threshold, location determination service 130 determines that the received rendering does not match the given entry notwithstanding the partial match. In response to determining that the received rendering matches a rendering of an entry, location determination service may determine that the location of driver 302 is at the location associated with the matching rendering. For example, location determination service 130 retrieves a location indicated by the entry that includes the matching rendering, and determines that the location indicated by this entry is the location of client device 110 of driver 302.

Process 500 continues with the application determining 506 a geospatial offset of a second client device of the second user (e.g., a client device of rider 303) from the first client device (e.g., client device 110 of driver 302). Determination of geospatial offset 304 was described above with respect to FIG. 3, the description of which carries full force and effect here. The application goes on to determine 508 a second location of the second client device based on the first location of the first client device and the geospatial offset. For example, the application takes the location of client device 110 of driver 302, and adds the geospatial offset (using both directional and distance components) to that location to determine the location of a client device carried by rider 303. Localization of the second client device may occur continuously based on continually localizing the first client device using the techniques described herein, and thereby deriving the location of the second client device using the geospatial offset.

The application generates for display 510 by the second client device AR content (or a peripheral of the second client device, such as AR goggles or glasses that communicate with the client device of rider 303), the AR content being selected based on an orientation of the second client device and the second location. Generation of AR content, and it being based on an orientation of the client device of rider 303 and the location of rider 303, was discussed above with respect to FIG. 4, the discussion of which carries full weight and effect here. While FIG. 4 depicts AR content visible to rider 403 at only one location, this is merely for illustrative purposes; multiple AR content may be visible to rider 403, depending on what direction rider 403 orients his or her client device (or corresponding peripheral).

In some embodiments, the application may detect that the rider has shifted positions while accessing AR content. For example, the application may detect that rider 303 has moved from position A to position C. The application may detect this movement by determining that geospatial offset 304 has changed. For example the application may periodically recalculate geospatial offset 304 to determine whether geospatial offset 304 has changed, and thus the location of rider 303 has changed. In response to determining that the geospatial offset has changed, the application may generate an updated geospatial offset, and may recalibrate the location of rider 303 based on the updated geospatial offset. In some embodiments, the application calculates the geospatial offset on a frequent basis and performs a frequent recalibration of the location of rider 303. In some embodiments, the application determines whether the geospatial offset has changed by a threshold magnitude and/or direction, and in response to determining that the geospatial offset has changed by the threshold magnitude and/or direction, the application recalibrates the location of rider 303. The latter embodiments save on processing resources, as recalibration is performed when the user has moved a threshold amount (e.g., to a new position, rather than shifting slightly in a same position where AR content enjoyment would not be impacted by the move).

In some embodiments, when localizing (or recalibrating) the client device of rider 303 to the client device of the driver (e.g., client device 110), the application may be unable to determine geospatial offset 304 using the techniques discussed in the foregoing. In such scenarios, the application may determine a pause in motion in both the first client device and second client device (e.g., due to vehicle 101 being parked stopped at a red light, stopped at a stop sign, etc.). The application may then capture an image using client device 110, and may identify a landmark in the image. The application may prompt rider 303 to capture a second image of the same landmark. For example, the application may identify a tree, a stop sign, a traffic light, etc., using image recognition techniques (e.g., as combined with the rendering techniques described above) and may identify an object to be the landmark. The prompt may include the image captured by the driver with a box or highlight or other accentuating feature around the landmark, and may include text or audio requesting that the user capture a photograph of the object. The prompt may alternatively omit the image and otherwise command the user to capture a photograph (e.g., by commanding the user to point his or her camera in a particular direction). The application may recalibrate the location of rider 303 based on the relative perspective of the second image with respect to the first image (e.g., by triangulating the landmark from the perspective of the image captured by the driver's client device and the perspective of the image captured by the rider's client device). This technique can be used in the first instance as well for determining the location of the rider.

The challenges in localizing the rider without using GPS are generally unique to the scenario where the rider is unable to capture complete images of the outside world. For example, when rider 303 is in the back of vehicle 301, forward-facing images will include features of the car, such as the back of the driver and passenger seats, the dashboard, etc. These features of the car may obstruct the ability of location determination service 130 to determine the rider's location directly, which is why the driver's location is used to localize the rider. When the rider exits vehicle 301, however, driver 302's location no longer informs rider 303's location. Thus, in some embodiments, the application determines when to hand off localization processes for the rider from using the driver's client device to using the rider's client device.

To this end, in some embodiments, the application determines a pose change of the rider 303. For example, the pose change may be detected based on feedback from a sensor of a client device carried by rider (e.g., an accelerometer providing feedback that is consistent with a motion of standing up, or walking, or an image sensor showing unobstructed forward-facing views). In response to determining the pose change, the application compares attributes of the pose change to each of a plurality of attributes that correspond to an end of the transportation session. For example, the application references entries of a database that compares the sensor feedback to feedback known to correspond to an end of the transportation session. In response to determining that the pose change corresponds to an end of the transportation session, the application determines rider 303's location using other means (e.g., using GPS traces or localizing rider 303 using the image rendering process described herein).

Handing off localization processes may occur on bases other than the application detecting pose change. For example, the application may detect input at client device 110 confirming that the transportation session is terminated (e.g., detect selection by the driver 302 of an "ride complete" option displayed at client device 110), and, in response to detecting, determine rider 303's location using other means.

Any other detection of the end of the transportation session may cause this hand off to occur.

Computing Hardware

Figure 6:
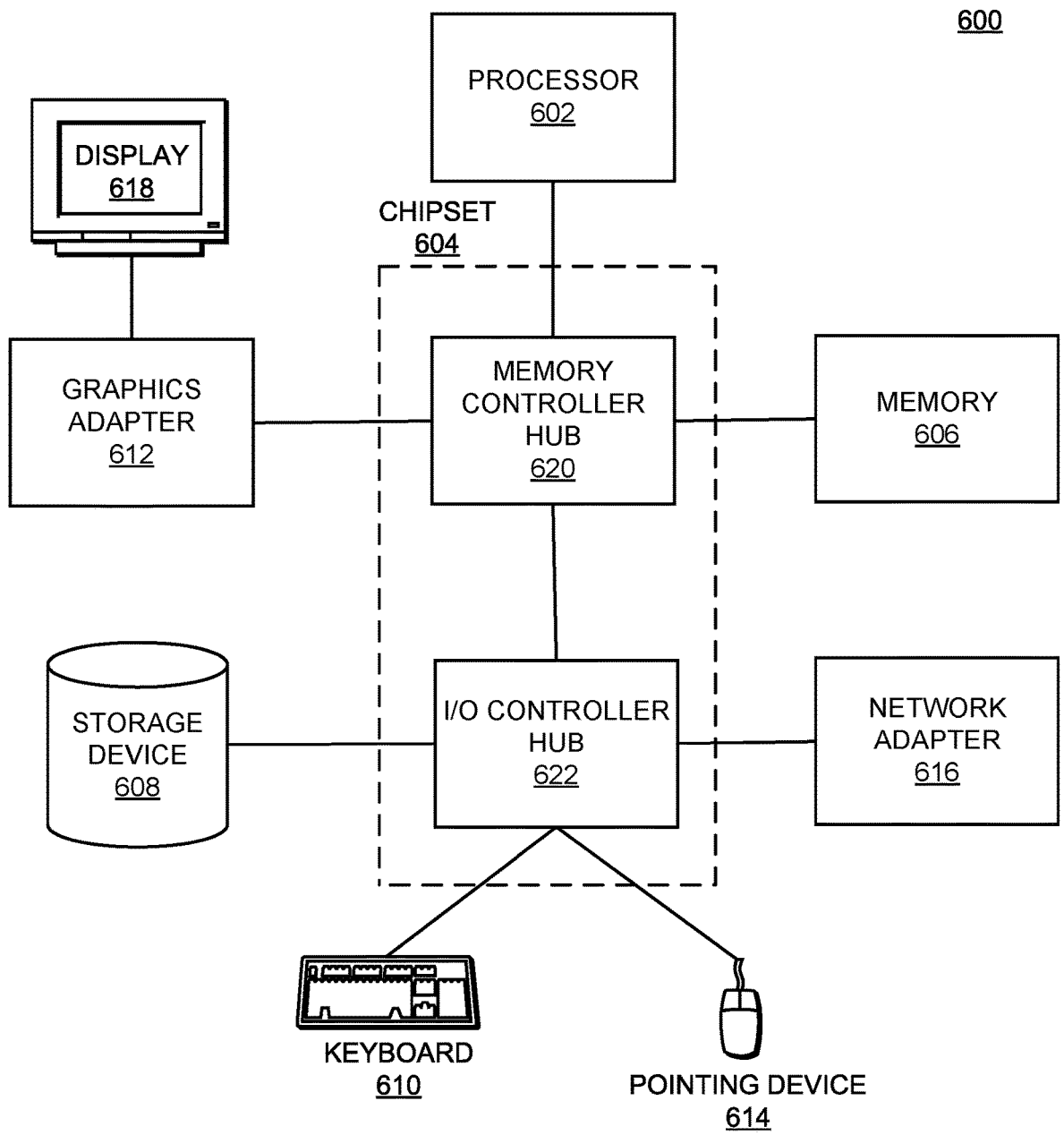
FIG. 6 is a block diagram that illustrates a computer system, according to one embodiment.

The entities shown in FIG. 1 are implemented using one or more computers. FIG. 6 is a block diagram that illustrates a computer system 600 for acting as a client device 110 or location determination service 130, according to one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604. A client device is often referred to herein as a mobile device, but can be any device capable of rendering AR content (e.g., AR glasses or goggles and the like).

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to the network 120.

As is known in the art, a computer 600 can have different and/or other components than those shown in FIG. 6. In addition, the computer 600 can lack certain illustrated components. For example, the computer acting as the location determination service 130 can be formed of multiple blade servers linked together into one or more distributed systems and lack components such as keyboards and displays. Moreover, the storage device 608 can be local and/or remote from the computer 600 (such as embodied within a storage area network (SAN)).

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for determining placement of augmented reality (AR) content, the method comprising:
   detecting that a transportation session has begun between a first user and a second user;
   in response to detecting that the transportation session has begun, determining a first location of a first client device of the first user using an image captured by the first client device;
   determining a geospatial offset of a second client device of the second user from the first client device;
   determining a second location of the second client device based on the first location of the first client device and the geospatial offset;
   determining that the geospatial offset has changed;
   in response to determining that the geospatial offset has changed, generating an updated geospatial offset by:
      determining a pause in motion in both the first client device and the second client device;
      identifying a landmark in a first image captured by the first client device during the pause in motion;
      causing the second client device to capture a second image of the same landmark; and
      recalibrating the second location based on the relative perspective of the second image with respect to the first image, the recalibrated second location indicative of the updated geospatial offset; and
   generating AR content for display by the second client device, the AR content being selected based on an orientation of the second client device and the recalibrated second location of the second client device.

2. The computer-implemented method of claim 1, wherein determining the first location of the first client device using the image captured by the first client device comprises:
   receiving, from the first client device, a rendering of the image;
   comparing the received rendering to entries in a database of renderings, each entry including a rendering and an associated location; and
   responsive to determining that the received rendering matches the rendering included in one of the database entries, determining that the location associated with the matching rendering is the first location.

3. The computer-implemented method of claim 1, wherein capturing the second image of the same landmark using the second client device comprises:
   prompting the second user to capture the second image of the same landmark, wherein the capturing is responsive to a user interaction relating to the prompt.

4. The computer-implemented method of claim 1, wherein generating for display by the second client device AR content, the AR content being selected based on the orientation of the second client device and the second location, comprises:
   rendering an object of the AR content for display at a relative location with respect to the second location, wherein the object is viewable by way of a display of the second client device when the orientation of the second client device is facing the relative location.

5. The computer-implemented method of claim 1, further comprising:
   determining a pose change of the second user;
   in response to determining the pose change, comparing attributes of the pose change to each of a plurality of attributes that correspond to an end of the transportation session;
   determining, based on the comparing, whether the attributes of the pose change correspond to the end of the transportation session; and
   in response to determining that the attributes of the pose change correspond to the end of the transportation session, re-determining the second location without reference to the first location.

6. The computer-implemented method of claim 1, further comprising:

detecting input at the first device confirming that the transportation session is terminated; and in response to detecting the input at the first device, re-determining the second location without reference to the first location.

7. A non-transitory computer-readable storage medium storing computer program instructions executable by a processor to perform operations for determining placement of augmented reality (AR) content, the operations comprising:

detecting that a transportation session has begun between a first user and a second user;

in response to detecting that the transportation session has begun, determining a first location of a first client device of the first user using an image captured by the first client device;

determining a geospatial offset of a second client device of the second user from the first client device;

determining a second location of the second client device based on the first location of the first client device and the geospatial offset;

determining whether the geospatial offset has changed;

in response to determining that the geospatial offset has changed, generating an updated geospatial offset by:

determining a pause in motion in both the first client device and the second client device;

identifying a landmark in a first image captured by the first client device during the pause in motion;

causing the second client device to capture a second image of the same landmark; and recalibrating the second location based on the relative perspective of the second image with respect to the first image, the recalibrated second location indicative of the updated geospatial offset; and generating AR content for display by the second client device, the AR content being selected based on an orientation of the second client device and the recalibrated second location of the second client device.

8. The non-transitory computer-readable storage medium of claim 7, wherein determining the first location of the first client device using the image captured by the first client device comprises:

receiving, from the first client device, a rendering of the image;

comparing the received rendering to entries in a database of renderings, each entry including a rendering and an associated location; and responsive to determining that the received rendering matches the rendering included in one of the database entries, determining that the location associated with the matching rendering is the first location.

9. The non-transitory computer-readable storage medium of claim 7, wherein capturing the second image of the same landmark using the second client device comprises:

prompting the second user to capture the second image of the same landmark, wherein the capturing is responsive to a user interaction relating to the prompt.

10. The non-transitory computer-readable storage medium of claim 7, wherein generating for display by the second client device AR content, the AR content being selected based on the orientation of the second client device and the second location, comprises:

rendering an object of the AR content for display at a relative location with respect to the second location, wherein the object is viewable by way of a display of the second client device when the orientation of the second client device is facing the relative location.

11. The non-transitory computer-readable storage medium of claim 7, the operations further comprising:

determining a pose change of the second user;

in response to determining the pose change, comparing attributes of the pose change to each of a plurality of attributes that correspond to an end of the transportation session;

determining, based on the comparing, whether the attributes of the pose change correspond to the end of the transportation session; and in response to determining that the attributes of the pose change correspond to the end of the transportation session, re-determining the second location without reference to the first location.

12. The non-transitory computer-readable storage medium of claim 7, the operations further comprising:

detecting input at the first device confirming that the transportation session is terminated; and in response to detecting the input at the first device, re-determining the second location without reference to the first location.

13. A system, comprising:

a processor for executing computer program instructions; and a non-transitory computer-readable storage medium storing computer program instructions executable by the processor to perform operations for determining placement of augmented reality (AR) content, the operations comprising:

detecting that a transportation session has begun between a first user and a second user;

in response to detecting that the transportation session has begun, determining a first location of a first client device of the first user using an image captured by the first client device;

determining a geospatial offset of a second client device of the second user from the first client device;

determining a second location of the second client device based on the first location of the first client device and the geospatial offset;

determining whether the geospatial offset has changed;

in response to determining that the geospatial offset has changed, generating an updated geospatial offset by:

determining a pause in motion in both the first client device and the second client device;

identifying a landmark in a first image captured by the first client device during the pause in motion;

causing the second client device to capture a second image of the same landmark; and recalibrating the second location based on the relative perspective of the second image with respect to the first image, the recalibrated second location indicative of the updated geospatial offset; and generating AR content for display by the second client device, the AR content being selected based on an orientation of the second client device and the recalibrated second location of the second client device.

14. The system of claim 13, wherein determining the first location of the first client device based on the image captured by the first client device comprises:

receiving, from the first client device, a rendering of the image;

comparing the received rendering to entries in a database of renderings, each entry including a rendering and an associated location; and responsive to determining that the received rendering matches the rendering included in one of the database entries, determining that the location associated with the matching rendering is the first location.

15. The system of claim 13, wherein capturing the second image of the same landmark using the second client device comprises:
prompting the second user to capture the second image of the same landmark, wherein the capturing is responsive to a user interaction relating to the prompt.

16. The system of claim 13, wherein generating for display by the second client device AR content, the AR content being selected based on the orientation of the second client device and the second location, comprises:
rendering an object of the AR content for display at a relative location with respect to the second location, wherein the object is viewable by way of a display of the second client device when the orientation of the second client device is facing the relative location.

17. The system of claim 13, the operations further comprising:
determining a pose change of the second user;
in response to determining the pose change, comparing attributes of the pose change to each of a plurality of attributes that correspond to an end of the transportation session;
determining, based on the comparing, whether the attributes of the pose change correspond to the end of the transportation session; and
in response to determining that the attributes of the pose change correspond to the end of the transportation session, re-determining the second location without reference to the first location.

* * * * *